(12) United States Patent
Borger

(10) Patent No.: US 10,364,186 B2
(45) Date of Patent: Jul. 30, 2019

(54) DRY MORTAR MIXTURE WITH GRAINS OF EXPANDED GLASS

(71) Applicant: CEVES-VERGEER BV, Deventer (NL)

(72) Inventor: Jeroen Borger, Vleuten (NL)

(73) Assignee: CEVES-VERGEER BV, Deventer (NL)

(*) Notice: Subject to any disclaimer, the term of this patent is extended or adjusted under 35 U.S.C. 154(b) by 0 days.

(21) Appl. No.: 15/319,955

(22) PCT Filed: Jun. 19, 2015

(86) PCT No.: PCT/NL2015/050451
§ 371 (c)(1),
(2) Date: Dec. 19, 2016

(87) PCT Pub. No.: WO2015/194958
PCT Pub. Date: Dec. 23, 2015

(65) Prior Publication Data
US 2017/0152182 A1    Jun. 1, 2017

(30) Foreign Application Priority Data

Jun. 20, 2014 (NL) .................................... 2013050
Jun. 18, 2015 (NL) .................................... 2014985

(51) Int. Cl.
*C04B 28/14* (2006.01)
*C04B 40/06* (2006.01)
(Continued)

(52) U.S. Cl.
CPC .............. *C04B 28/14* (2013.01); *C04B 14/06* (2013.01); *C04B 14/24* (2013.01); *C04B 24/24* (2013.01);
(Continued)

(58) Field of Classification Search
USPC ........................................................... 156/71
See application file for complete search history.

(56) References Cited

U.S. PATENT DOCUMENTS 4,067,758 A * 1/1978 Sommer ................ E04B 1/164
156/280
4,129,696 A * 12/1978 Markusch ............ C08G 18/302
521/154
(Continued)

FOREIGN PATENT DOCUMENTS

CN        103 043 959 A      4/2013
JP        H11 116311 A       4/1999
(Continued)

OTHER PUBLICATIONS

International Search Report, dated Nov. 16, 2015, from corresponding PCT application.

*Primary Examiner* — Sing P Chan

(57) ABSTRACT

Dry mortar mixture characterized by a glass mixture of expanded glass beads with a grain size d/D 0/8, mixed in a ratio of between 1:1 and 1:3, for example 1:2 with a dust poor or dust free binding mixture of hydraulic binders and stone granules in the weight ratio of 1:2 to 1:4. The glass has a discontinuous grain distribution. For the glass mixture the fractions 0.5/1.0 and 2.0/4.0 are present while the fractions 0.25/0.5 and 1.0/2.0 are absent. For the glass mixture preferably all grain sizes between 1.0 and 2.0 mm are absent and the grain size distribution is around an average, so that an open structure is obtained.

6 Claims, 1 Drawing Sheet

(51) Int. Cl.

| | | |
|---|---|---|
| *E04F 13/02* | (2006.01) | |
| *C04B 24/24* | (2006.01) | |
| *C04B 14/06* | (2006.01) | |
| *E04F 15/12* | (2006.01) | |
| *C04B 24/26* | (2006.01) | |
| *C04B 28/04* | (2006.01) | |
| *C04B 28/06* | (2006.01) | |
| *C04B 14/24* | (2006.01) | |
| *C04B 24/06* | (2006.01) | |
| *C04B 20/00* | (2006.01) | |
| *E04F 15/02* | (2006.01) | |
| *C04B 111/00* | (2006.01) | |
| *C04B 111/60* | (2006.01) | |
| *C04B 111/20* | (2006.01) | |
| *C04B 111/27* | (2006.01) | |
| *C04B 103/00* | (2006.01) | |

(52) U.S. Cl.
 CPC ......... *C04B 24/2623* (2013.01); *C04B 28/04* (2013.01); *C04B 28/06* (2013.01); *C04B 40/0608* (2013.01); *E04F 13/02* (2013.01); *E04F 15/02155* (2013.01); *E04F 15/12* (2013.01); *C04B 2103/0057* (2013.01); *C04B 2111/00612* (2013.01); *C04B 2111/27* (2013.01); *C04B 2111/29* (2013.01); *C04B 2111/60* (2013.01)

(56) References Cited

U.S. PATENT DOCUMENTS

| | | | | |
|---|---|---|---|---|
| 4,562,109 A * | 12/1985 | Harvey | | C04B 26/02 427/243 |
| 4,623,584 A * | 11/1986 | Masui | | B32B 5/18 264/257 |
| 4,634,724 A * | 1/1987 | Harvey | | C04B 26/02 427/243 |
| 4,641,470 A * | 2/1987 | Baumberger | | E04C 1/41 52/309.17 |
| 4,882,219 A * | 11/1989 | Harvey | | C04B 26/02 428/220 |
| 7,695,560 B1 | 4/2010 | Buarque De Macedo | | |
| 7,965,560 B2 | 6/2011 | Tsao et al. | | |
| 8,030,394 B2 * | 10/2011 | Drigo | | E04D 5/02 427/407.1 |
| 8,931,230 B2 * | 1/2015 | Negri | | C04B 26/18 52/417 |
| 9,034,094 B2 * | 5/2015 | Scanlan | | C04B 32/00 106/400 |
| 9,140,015 B2 * | 9/2015 | Negri | | E04F 13/0898 |
| 9,249,578 B2 * | 2/2016 | Negri | | C04B 26/18 |
| 9,365,455 B2 * | 6/2016 | Hargrove | | E04F 13/04 |
| 2006/0292358 A1 * | 12/2006 | Robertson | | B28B 1/16 428/312.4 |
| 2010/0317773 A1 * | 12/2010 | Drigo | | E04D 5/02 524/70 |
| 2013/0145968 A1 * | 6/2013 | Scanlan | | C04B 32/00 106/676 |
| 2014/0083035 A1 * | 3/2014 | Negri | | C04B 26/06 52/353 |
| 2015/0007519 A1 * | 1/2015 | Negri | | E04F 13/0898 52/417 |
| 2015/0083303 A1 * | 3/2015 | Negri | | C04B 26/06 156/71 |
| 2015/0251954 A1 * | 9/2015 | Scanlan | | C04B 32/00 106/676 |
| 2015/0284543 A1 * | 10/2015 | Hargrove | | C04B 26/06 52/745.09 |
| 2016/0368659 A1 * | 12/2016 | Bastian, II | | B65D 19/0014 |
| 2017/0096366 A1 * | 4/2017 | Vilinska | | C04B 28/14 |
| 2017/0096369 A1 * | 4/2017 | Vilinska | | C04B 28/14 |
| 2017/0152182 A1 * | 6/2017 | Borger | | C04B 28/14 |
| 2018/0093920 A1 * | 4/2018 | Calvin | | C04B 18/027 |

FOREIGN PATENT DOCUMENTS

| | | | | |
|---|---|---|---|---|
| JP | 2006/183431 A | 7/2006 | | |
| WO | WO-2014162097 A1 * | 10/2014 | ............ | C04B 28/04 |

* cited by examiner

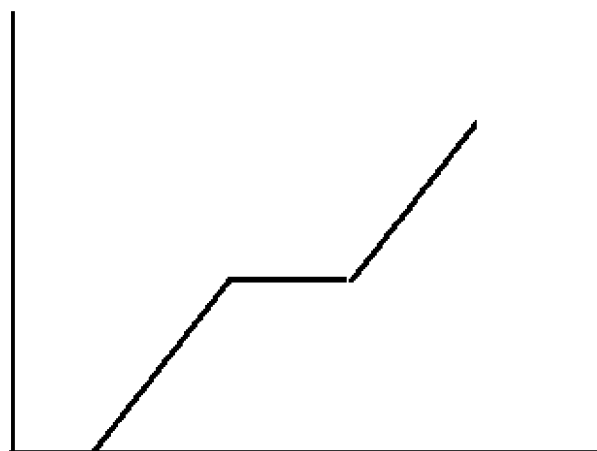

DRY MORTAR MIXTURE WITH GRAINS OF EXPANDED GLASS

This invention relates to a dry mortar mixture, which after mixing with water provides a water and preferably frost-resistant mortar of thin layer thickness with which one can make a leveling, elastic layer on arbitrary substrates, which meets one or more of DIN18353, DIN19353 and DIN18156 and onto which a covering floor covering can be applied, such as carpet, floor tiles or parquet. This mortar mixture comprises grains of expanded glass.

The dry mortar mixture of the invention is characterized by a glass mixture of expanded glass beads (glass granulate) with a grain size (preferably with a discontinuous grain distribution) d/D 0/8 (present are grains of at least 0 and at most 8.0 millimeter diameter), mixed in a ratio of between 1:1 and 1:3, for example 1:2 (for example, 6 kg glass mixture and 12 kg of binder mixture) with a dust poor or dust free binding mixture of hydraulic binders and sand (stone granules) in the weight ratio of 1:2 to 1:4, wherein to the binder mixture preferably one or more of the following additives (preferably a minimum of 0.1 or 1.0, or 10% by weight per additive) is added: elastomers in powder form (for example, ground rubber); in water re-dispersible resin powder (e.g., alkali resistant copolymer, for example, ethylene vinyl acetate copolymer); alkali metal salt, anti-foaming agent; aniogeen or non-aniogeen surfactant (alkali-resistant); hydroxyl carboxylic acid (e.g., tartaric acid, citric acid, gluconic acid, glycolic acid) or salt (e.g., lithium salt) thereof; typical additives (e.g., one or more of preservatives, thickeners, liquefaction agents).

The mortar mixture is mixed at the construction site with water, for example, 3.5 liters of water to 18 kg of dry mortar mixture, to a plastic mortar and in a thickness of approximately between 5 and 25 mm, spread on the substrate with a smooth string, a blade or a leveling strip. Onto the cured layer, for example with the aid of a dispersion adhesive, the floor or wall covering (top layer) can be applied.

The mortar can be used for a wooden or concrete floor or wall (a wall to be tiled in particular) in the bathroom, toilet, living room, kitchen, bedroom, hallway or landing of a permanent home on shore. Other applications are also conceivable.

With the invention a smoothing layer can be realized of 800 kg, which traditionally weighs 4000 kg. The specific weight of the completed, ready to be spread, mixed mortar is 0.8 (of a traditional mortar at least 1.9). The dry time of this mortar is very short compared to a traditional mortar.

For the glass mixture preferably one or more of the following applies: for the d/D, the d is a minimum of 0.2 or 0.4 or 0.5 and/or D a maximum of 6.0 or 5.0 or 4.5 or 4.0 or 3.5; for the d/D one or more grain sizes are missing, for example, grain sizes that are between 25% and 50% smaller than D and/or between 200% and 400% greater than d; present are a fraction 0.5/1.0 and/or 2.0/4.0 (the d and/or D may differ 10 or 20% from these values); the fraction 0.25/0.5 and/or 1.0/2.0 is absent (the d and/or D may differ 10 or 20% from these values); one or more grain sizes between 1.0 and 2.0 millimeters (or a 10 or 20% of one or both deviating value) is absent (preferably all grain sizes); the percentage by mass of the present granule sizes is substantially the same; the grain size distribution is around an average, so that an open structure is obtained; the average grain size distribution of the glass granulate is at least substantially a factor of 1.25 larger in comparison with the average grain size distribution of the sand or the sand including the remaining mineral granulate; the amount of glass granulate of the smallest sieve size is less than 65% of total glass mixture; the d50 value (grain size associated with the median of the summed mass percentage of the grains) of the glass is preferably between 1.0 and 3.0 mm; the voids content of the unbound glass mixture is preferably between 25 and 45 vol %; instead of absent can a grain size which is declared as missing be present in a significantly lower percentage by mass, for example at least 75% less; the specific weight of the glass granulate is between about 0.3 and 0.6 (specific gravity of water=1.0); contains at least two fractions, and optionally lacks a fraction between two fractions (fraction=undivided group grain sizes, for example, all grain sizes between 0.5 and 1.0 or between 2.0 and 4.0, for example, as commercially available).

The hydraulic binder contains a content by weight of mineral binder, for example a content of Portland cement, trass Portland cement, trass cement, iron portland cement, white cement, gypsum, plaster and/or aluminum melt cement. The binder is preferably present in an excess.

The sand, preferably quartz sand, preferably has a grain size between 0 and 8 mm, more preferably at least 0.05 mm and/or not more than 3 mm.

EXAMPLE I

The dry binding mixture contains: 200 parts by weight portland cement (hydraulic binder), 400 parts by weight sand from 0.12 to 2 mm, 25 parts by weight elastomers, 15 parts by weight again in water dispersible synthetic material powder, 5 parts by weight of a mixture of 1 mole of lithium carbonate and 1 mole of tartaric acid, 5 parts by weight alkali metal salt (on sodium basis), 10 parts by weight anti-foaming agent and 10 parts by weight surfactant. The dry glass mixture contains: in equal parts only fractions 0.5-1.0 mm and 2.0-4.0 mm. The dry mortar mixture contains 6 kg dry glass mixture to 12 kg of dry binder mixture, at the building site 3.5 liters of water is added thereto.

EXAMPLE II

As Example I, the hydraulic binder comprises portland quick-cement, gypsum hemihydrate, and clay-earth-quick cement in the weight ratio 1:1:1.

EXAMPLE III

The dry binder mixture contains: 200 parts by weight hydraulic binder, 500 parts by weight sand from 0.12 to 2 mm, 35 parts by weight of rubber powder, 10 parts by weight alkali-resistant re-dispersible vinyl acetate-ethene copolymer, 5 parts by weight calcium salt of diisopropyl naftalene sulfonacid as an anti-foaming agent, 5 parts by weight of the sodium salt of a with sulfonic groups modified melamine-formaldehyde condensation product to provide flowability, 5 parts by weight alkylaryl sulphonate. The dry glass mixture contains: in equal parts only the sieve fractions 0.5-1.0 mm and 2.0-4.0 mm. The dry mortar mixture contains 6 kg dry glass mixture to 12 kg of dry binder mixture, at the building site 3.5 liters of water is added thereto.

EXAMPLE IV

The dry binding mixture contains: 1000 parts by weight of portland cement and tras cement in the ratio 30:70, 2000 parts by weight quartz sand from 0.12 to 2 mm, 180 parts by weight of rubber powder, 60 parts by weight redispersible resin powder, 15 parts by weight of the calcium salt of diisobutyl naftalene sulfonacid (anti-foaming), 15 parts by weight anti-foaming agent, 15 parts by weight flow agent, 15 parts by weight alkylarylsulphonate. The dry glass mixture contains: in equal parts only the sieve fractions 0.5-1.0 mm and 2.0-4.0 mm.

The dry mortar mixture contains 6 kg dry glass mixture to 12 kg of dry binder mixture, at the building site 3.5 liters of water is added thereto.

EXAMPLE V

The same as any of examples I-IV, with the exception that the dry glass mixture contains in equal parts the sieve fractions 0.25-0.5 and 0.5-1.0 and 2.0-4.0 mm.

After curing the mortars of the above examples satisfy the following conditions (DIN18156): compressive strength 25 MPa, flexural strength 8 MPa, adhesion-tensile strength 1.5 MPa (dry and 0.8 MPa (wet), shear strength 9 N/mm (dry) and 6 N/mm (wet).

Commercially available fractions expanded glass granulate are for example: 0.1-0.3; 0.25-0.5; 0.5-1.0; 1.0-2.0; 2.0-4.0; 4.0-8.0.

The values indicated in the Examples I-V may differ 10 or 20%.

The attached single FIGURE shows the discontinuous grain size distribution of the glass according to an example according to which the glass mixture consists of the two fractions 0.5/1.0 and 2.0/4.0 (d/D=0.5/4.0 for the total glass mixture), and all other groups are missing, while the two fractions are present in equal mass percentage (50/50). Vertically, the summed mass percentage and horizontally the grain size of the granulate are indicated.

The invention claimed is:

1. A dry mortar mixture comprising:
a glass granulate comprising a glass mixture of expanded glass beads, said glass granulate having a grain size with a discontinuous grain distribution d/D 0/4, such that said glass granulate has grains of at least 0 and at most 4.0 millimeter diameter; and
stone granules comprising a dust free binding mixture of hydraulic binders and sand,
wherein:
said glass granulate is mixed in a ratio of between 1:1 and 1:3 with said stone granules, said stone granules being in a weight ratio of between 1:2 and 1:4; and
wherein for the glass mixture:
the d/D fractions 0.5/1.0 and 2.0/4.0 are present while the fractions 0.25/0.5 and 1.0/2.0 are absent, such that for the glass mixture all grain sizes between 1.0 and 2.0 mm are absent,
the grain size distribution is around an average, so that an open structure is obtained, and
a fraction relates to an undivided group of grain sizes.

2. The mixture according to claim 1, wherein said dust free binding mixture further comprises a minimum of 0.1% by weight of each of:
elastomers in powder form;
in water re-dispersible resin powder;
alkali metal salt,
anti-foaming agent;
aniogeen and non-aniogeen surfactant;
hydroxyl carboxylic acid; and
one of preservatives, thickeners, liquefaction agents.

3. The mixture according to claim 1, wherein:
the average grain size distribution of the glass granulate is at least a factor of 1.25 larger in comparison with the average grain size distribution of the sand; and
in the glass mixture, a grain size associated with a median of a summed mass percentage of the grains, is between 1.0 and 3.0 mm; and
wherein the mixture is mixed in a ratio of 1:2, being 6 kg of glass mixture and 12 kg of binder mixture.

4. The mixture according to claim 1, wherein:
the hydraulic binder comprises a content by weight of Portland cement as a mineral binder;
the hydraulic binder is present in an excess; and
the sand has a grain size of at least 0.05 mm and not more than 3 mm.

5. A method comprising:
mixing the mixture according to claim 1 with water at a construction site, thereby creating a plastic mortar;
spreading the plastic mortar in a thickness of approximately between 5 and 25 mm on a substrate with a blade;
applying the mortar onto a concrete floor in the bathroom of a permanent home on shore and onto a cured mortar layer, with the aid of a dispersion adhesive; and
applying a floor covering, thereby providing a top layer.

6. A dry mortar mixture comprising:
a glass granulate that comprises a glass mixture of expanded glass beads, having a grain size with a discontinuous grain distribution d/D 0/4, such that the glass granulate comprises grains of at least 0 and at most 4.0 millimeter diameter; and
a dust free binding mixture,
wherein said glass granulate is mixed in a ratio of between 1:1 and 1:3 with said dust free binding mixture,
said dust free binding mixture comprising hydraulic binders and sand in a weight ratio of between 1:2 and 1:4;
wherein for the glass mixture d/D fractions 0.5/1.0 and 2.0/4.0 are present while the fractions 0.25/0.5 and 1.0/2.0 are absent, such that for the glass mixture all grain sizes between 1.0 and 2.0 mm are absent and the two fractions are present in equal mass percentage, wherein:
the grain size distribution is around an average, so that an open structure is obtained, and
a fraction relates to an undivided group of grain sizes;
said dust free binding mixture further comprising a group of additives at a minimum of 0.1% by weight per additive, said group of additives comprising:
elastomers in powder form;
in water re-dispersible resin powder;
alkali metal salt, anti-foaming agent;
aniogeen surfactant;
hydroxyl carboxylic acid; and
one of preservatives, thickeners, liquefaction agents;
wherein:
for the glass mixture a grain size associated with a median of the summed mass percentage of the grains of the glass is between 1.0 and 3.0 mm;
the hydraulic binder contains Portland cement;
the binder is present in an excess; and
the sand has a grain size of at least 0.05 mm and not more than 3 mm.

* * * * *